United States Patent
Lux

(10) Patent No.: US 10,026,091 B2
(45) Date of Patent: Jul. 17, 2018

(54) METHOD FOR SUPPORTING A VEHICLE

(71) Applicant: VOLKSWAGEN AG, Wolfsburg (DE)

(72) Inventor: Stefan Lux, Meine (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/139,053

(22) Filed: Apr. 26, 2016

(65) Prior Publication Data

US 2016/0321674 A1 Nov. 3, 2016

(30) Foreign Application Priority Data

Apr. 30, 2015 (DE) .................. 10 2015 208 052
May 13, 2015 (DE) .................. 10 2015 208 914

(51) Int. Cl.
| | | |
|---|---|---|
| G06Q 30/00 | (2012.01) | |
| G01C 21/34 | (2006.01) | |
| G06Q 10/00 | (2012.01) | |
| G05D 1/00 | (2006.01) | |

(52) U.S. Cl.
CPC ......... *G06Q 30/016* (2013.01); *G05D 1/0088* (2013.01); *G06Q 10/20* (2013.01)

(58) Field of Classification Search
CPC .... G06Q 30/16; G06Q 10/20; G01C 21/3407; G05D 1/0088
See application file for complete search history.

(56) References Cited

U.S. PATENT DOCUMENTS

| | | | |
|---|---|---|---|
| 9,019,092 B1 * | 4/2015 | Brandmaier | B60R 25/102 |
| | | | 340/426.1 |
| 2005/0111948 A1 * | 5/2005 | Nolasco | B60P 3/125 |
| | | | 414/563 |
| 2011/0127366 A1 * | 6/2011 | Becker | B64F 1/22 |
| | | | 244/50 |
| 2011/0194925 A1 * | 8/2011 | Nespor | B60P 3/07 |
| | | | 414/812 |

(Continued)

FOREIGN PATENT DOCUMENTS

| | | |
|---|---|---|
| DE | 3843043 A1 | 6/1990 |
| DE | 19640735 A1 | 4/1998 |

(Continued)

OTHER PUBLICATIONS

Search Report for German Patent Application No. 10 2015 208 914.2; dated Feb. 12, 2016.

*Primary Examiner* — Rodney A Butler
(74) *Attorney, Agent, or Firm* — Barnes & Thornburg LLP

(57) ABSTRACT

A method for assisting a vehicle which is determined to be undrivable, which includes requesting an assistance vehicle by position information of the vehicle and navigating the assistance vehicle to the vehicle by the position information. The method determines, using a cause of why the vehicle is undrivable further, whether restoring the driving capability of the vehicle requires human assistance and navigates the vehicle with the assistance vehicle in a driverless state to a location of the vehicle at least if the restoring process does (Continued)

not require human assistance or merely requires remote human assistance. Also disclosed is a method for assisting a vehicle which requires repair and/or maintenance, wherein the vehicle is taken in a driverless state to a repair location.

8 Claims, 2 Drawing Sheets

(56) References Cited

U.S. PATENT DOCUMENTS

| | | | | |
|---|---|---|---|---|
| 2012/0083959 A1* | 4/2012 | Dolgov | ............... | G05D 1/0214 |
| | | | | 701/23 |
| 2012/0195722 A1* | 8/2012 | Nespor | ................... | B60P 3/07 |
| | | | | 414/477 |
| 2014/0249736 A1* | 9/2014 | Beda | .................... | G08G 5/065 |
| | | | | 701/120 |
| 2015/0235480 A1* | 8/2015 | Cudak | ................. | G05D 1/0027 |
| | | | | 701/2 |
| 2015/0283919 A1* | 10/2015 | Baek | ................... | B60L 15/2045 |
| | | | | 701/22 |
| 2016/0231747 A1* | 8/2016 | Neff | .................... | G05D 1/0231 |

FOREIGN PATENT DOCUMENTS

| | | |
|---|---|---|
| DE | 19832498 A1 | 2/2000 |
| DE | 20015605 U1 | 11/2000 |
| DE | 10102051 A1 | 8/2002 |
| DE | 10243093 A1 | 3/2004 |
| DE | 10322765 A1 | 1/2005 |
| DE | 10329871 A1 | 1/2005 |
| DE | 102004016227 A1 | 10/2005 |
| DE | 102006002391 A1 | 7/2007 |
| DE | 102009018293 A1 | 11/2010 |
| DE | 102010039879 A1 | 3/2012 |
| DE | 102011115854 A1 | 4/2013 |
| JP | 2010036644 A * | 2/2010 |
| JP | 5132471 B2 * | 1/2013 |

* cited by examiner

METHOD FOR SUPPORTING A VEHICLE

PRIORITY CLAIM

This patent application claims priority to German Patent Application Nos. 10 2015 208.052.8, filed 30 Apr. 2015, and 10 2015 208 914.2, filed 13 May 2015, the disclosures of which are incorporated herein by reference in their entirety.

SUMMARY

Illustrative embodiments relate to a method for assisting a vehicle which is undrivable (i.e., should not or cannot be driven further) owing, for example, to a problem which has occurred during operation.

BACKGROUND

If a vehicle is undrivable (i.e., should not or cannot be driven further) and a user of the vehicle cannot alone restore it to a state in which it is permissible and possible for it to be driven further, the user is reliant on assistance.

This assistance is generally ensured by means of a so-called breakdown service. To acquire the assistance, the user requests an assistance vehicle by means of position information of his vehicle by telephone or via the Internet, for example. Sometimes, the user also communicates an actual or suspected problem, or an actual or suspected cause of the problem, in the request.

Subsequently, a person skilled in the art navigates the assistance vehicle to the vehicle by means of the position information.

Disclosed embodiments provide assistance for vehicles which require repair and/or maintenance.

BRIEF DESCRIPTION OF THE DRAWINGS

Disclosed embodiments are explained in greater detail below using the associated drawings, in which.

DETAILED DESCRIPTION OF THE DISCLOSED EMBODIMENTS

Disclosed embodiments provide a method for assisting a vehicle which requires repair and/or maintenance. The vehicle is taken in a driverless state to a repair location according to the disclosed method.

Disclosed embodiments provide a further method for assisting a vehicle which is undrivable (i.e., should not or cannot be driven further). The further method comprises requesting an assistance vehicle by means of position information of the vehicle and navigating the assistance vehicle to the vehicle by means of the position information. The further method comprises determining, using a cause of why the vehicle is undrivable, whether restoring the driving capability of the vehicle requires human assistance, and determining to navigate with the assistance vehicle (30) in a driverless state to a location of the vehicle at least if the restoring process does not require human assistance or merely requires remote human assistance.

In at least one disclosed embodiment, the vehicle is towed by an assistance vehicle in a driverless state to the repair location, if the vehicle is undrivable.

Furthermore, the method can comprise requesting the assistance vehicle by means of position information of the vehicle and navigating the assistance vehicle to the vehicle in a driverless state by means of the position information.

The method can also comprise detecting that restoring the driving capability of the vehicle does not require human assistance or merely requires remote human assistance. The detection can be carried out using a problem and/or a cause for why the vehicle is undrivable.

Furthermore, the method can comprise: transmitting information relating to the cause or the problem, wherein the detection then takes place outside the vehicle using the transmitted information.

Alternatively or additionally, the detection can take place in the vehicle using the cause. The request can then comprise an indication that the remedying of the cause requires human assistance, and/or a negative indication that the remedying of the cause does not require human assistance or only requires remote assistance.

The assistance vehicle can also navigate in a driverless state to the vehicle if the remedying of the cause requires human assistance by a person skilled in the art at the location of the vehicle, wherein the assistance vehicle then transports the person skilled in the art to the vehicle.

The requesting of the assistance vehicle can be carried out automatically by the vehicle.

The method can also comprise driverless navigation of the assistance vehicle to a breakdown service location.

The various embodiments which are specified in this application are, unless stated otherwise in an individual case, capable of being combined with one another.

Figure 1:
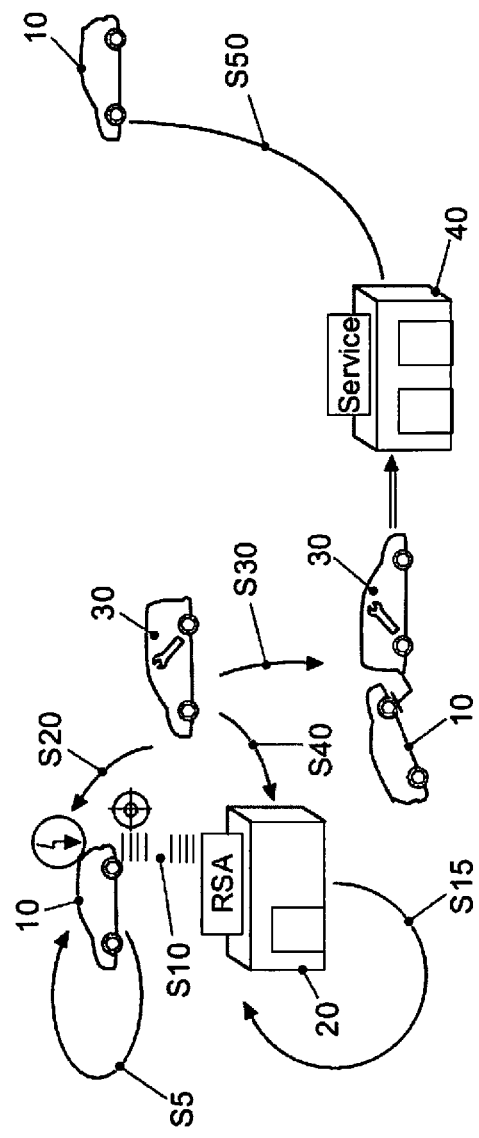
FIG. 1 shows an exemplary embodiment.

FIG. 1 shows an exemplary embodiment.

Vehicle 10 is situated at a location and is undrivable in the example, and a driver of the vehicle 10 objectively or subjectively requires assistance.

Then, a first operation at S10 of the exemplary embodiment of the method is carried out, which comprises requesting an assistance vehicle 30 from a breakdown service location 20 (also referred to as roadside assistance (RSA)). In the exemplary embodiment this is done by means of position information of the vehicle. Subsequently, operation at S20 is carried out which comprises navigating the assistance vehicle to the location by means of the position information. Operation at S20 is carried out in a driverless state, that is to say completely autonomously, partially autonomously with remote monitoring or automatically with remote control, at least if restoration of the driving capability of the vehicle does not require human assistance or merely requires remote human assistance.

In the scope of operation at S10, the request can comprise one or more causes for why the vehicle is undrivable.

The method can then also comprise an operation at S15 which is carried out at the breakdown service location 20. This operation at S15 comprises: deciding whether restoring the driving capability of the vehicle requires human assistance using the communicated cause or causes.

It is also possible that in an operation at S5 the causes are evaluated in the vehicle 10 and it is decided whether restoring the driving capability of the vehicle requires human assistance. The request in operation at S10 can then comprise an indication or a negative indication with respect to the need for human assistance at the vehicle 10.

If the assistance vehicle 30 has reached the vehicle 10, the driver of the vehicle 10 can take measures to restore the permitted drivable state, by means of the assistance vehicle 30. In this context, he can be assisted by means of interactive service instructions which are made available to him, for example, via a screen of the assistance vehicle 30 or via a screen of a mobile phone of the assistance vehicle 30 and/or from the Internet.

If the restoration measures are not available or not successful, the assistance vehicle 30 can tow the vehicle 10, for example, in operation at S30, to a repair or maintenance facility 40 (servicing facility). The vehicle 10 can then be repaired there. In operation at S50, the repaired vehicle 10 can then navigate in a driverless state, that is to say completely autonomously, partially autonomously with remote monitoring or automatically with remote control, to the location or to a residence of the driver or of a keeper of the vehicle.

If the restoration measures are successful, in an operation at S40 the assistance vehicle 30 can navigate back in a driverless state, that is to say completely autonomously, partially autonomously with remote monitoring or automatically with remote control, to the breakdown service location 20.

In at least one disclosed embodiment of the method, a control device of a vehicle causes a breakdown service vehicle to be called, in response to a breakdown detection by means of a sensor system of the vehicle, or in response to signaling by the driver. This is usually done at least when the breakdown is such that the vehicle is undrivable. The service may be requested with position information of the vehicle. A breakdown service vehicle then drives to the location of the vehicle from a breakdown service location in a driverless state, that is to say completely autonomously, partially autonomously with remote monitoring or automatically with remote control.

During the interaction of the service with the driver and/or the vehicle it is optionally possible to determine whether the driver who is seeking assistance can solve the problem himself with the breakdown service vehicle without human assistance. Examples of breakdowns which at most require only assistance by the driver himself are external starting or towing in the case of a breakdown of the engine. The breakdown service vehicle can then drive to the location of the vehicle without a service technician on board. The vehicle is then restored to a permitted drivable state by the driver himself by means of the breakdown service vehicle.

The breakdown service vehicle then navigates back, for example, to the breakdown service location in a driverless state, that is to say completely autonomously, partially autonomously with remote monitoring or automatically with remote control. Alternatively, the vehicle is coupled by the driver to the breakdown service vehicle by means of a towing device and is subsequently towed to a repair facility by the breakdown service vehicle in a driverless state, that is to say completely autonomously, partially autonomously with remote monitoring or automatically with remote control. In this context, the repair facility can be at or in the vicinity of the breakdown service location or of some other breakdown service location.

The other breakdown service location or the repair facility itself can be located in the vicinity of a residence of the keeper or of the driver of the vehicle. If this breakdown service vehicle tows the vehicle to the other breakdown service location or to the repair facility which is, however, not at or in the vicinity of the breakdown service location, the vehicle can return to the breakdown service location in a driverless state, that is to say completely autonomously, partially autonomously with remote monitoring or automatically with remote control, after the towing operation. It is also possible that the vehicle remains at the other breakdown service location or drives from the repair facility in a driverless state, that is to say completely autonomously, partially autonomously with remote monitoring or automatically with remote control.

In this or another exemplary embodiment of the method, the control device of the vehicle causes, in response to the breakdown detection by a sensor system of the vehicle or signaling by the driver, the vehicle to drive to a repair facility in a driverless state, that is to say completely autonomously, partially autonomously with remote monitoring or automatically with remote control. This can be done, for example, if the breakdown is such that the vehicle can and should be driven further, in particular, be driven in a driverless state. The repair facility which is driven to can be driven to automatically, semi-automatically with interaction with the driver or completely by means of the interaction with the driver. Furthermore, the driverless vehicle driving to the repair facility can require confirmation by the driver. The confirmation can be, for example, vehicle-internal signaling or approval, for example, via display and/or operator control elements in the vehicle or via vehicle-external signaling or approval, for example, via a smartphone app and/or a website.

After the servicing has been carried out, the vehicle returns to a location which can be defined by the driver.

Figure 2:
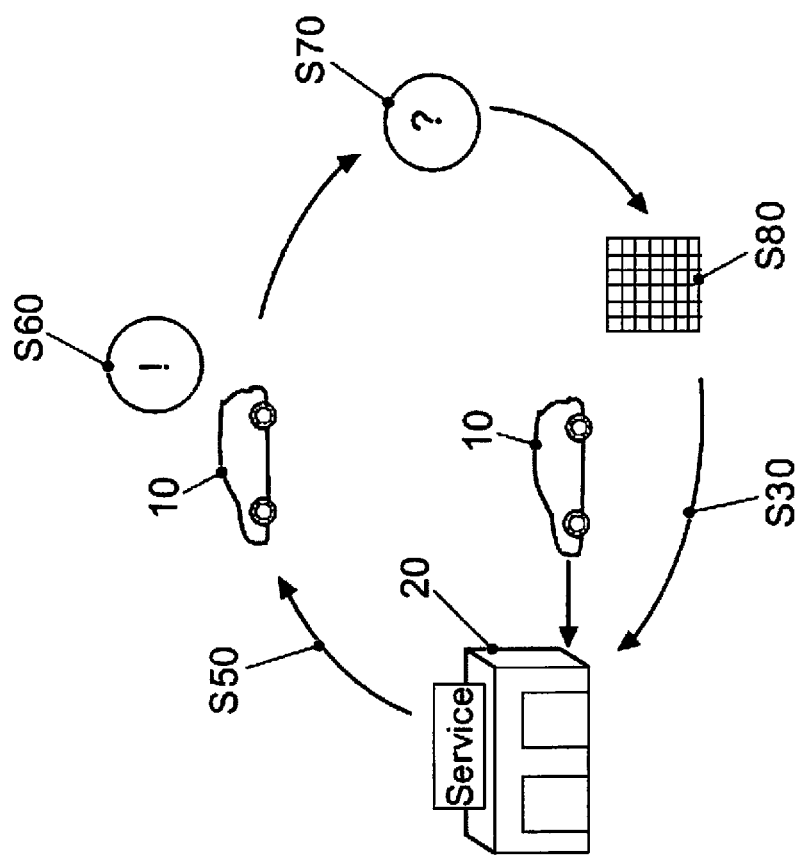
FIG. 2 shows a further exemplary embodiment.

FIG. 2 shows this by way of example. A vehicle 10 which is capable of driving in a driverless state is situated at a location and is in need of maintenance or repair. In the example, it is possible and permissible for the vehicle 10 to continue to be driven further in a driverless state.

This is detected automatically by the vehicle in a first operation at S60 of the further exemplary embodiment of the method. In an optional operation at S70, the vehicle 10 interrogates the keeper of the vehicle or the current driver whether it is desired for the vehicle 10 to drive to a service facility in a driverless state. If this is confirmed, the vehicle 10 automatically makes an appointment with a repair facility 20 in operation at S80. This is done, for example, in a wireless state using an application on a smartphone or via an Internet page. In this context, the vehicle 10 can optionally take into account an electronic appointment calendar of the keeper or user of the vehicle if the calendar is correspondingly accessible, for example, because it is stored in the smartphone or can be called via the Internet. Additionally or alternatively, driving times from the location to the repair facility 20 and/or from the repair facility 20 to a place which can be defined by the driver or is defined in advance can be taken into account in the agreement of the appointment. Operation at S30 is then carried out in good time before the appointment by navigating the vehicle in a driverless state to the repair facility 20. After the repair or maintenance, in operation at 50 the vehicle navigates in a driverless state to the defined place or to the location.

If a vehicle is undrivable and a user of the vehicle cannot alone restore it to a state in which it is permissible and possible for it to be driven further, the user is reliant on assistance.

This assistance is generally ensured by means of a so-called breakdown service. To acquire the assistance, the user requests an assistance vehicle by means of position information of his vehicle by telephone or via the Internet, for example. Sometimes, the user also communicates an actual or suspected problem, or an actual or suspected cause of the problem, in the request.

Subsequently, a person skilled in the art navigates the assistance vehicle to the vehicle by means of the position information.

DE 2005 15 606 U 1 describes a maintenance system for a passenger car which, when a malfunction of a third category occurs which does not permit further travel or self-help by the driver, sets up a telecommunication link to an emergency call center and informs the center of the current position of the passenger car. Subsequently, a mobile maintenance vehicle is sent to the location of the passenger car to provide help.

Autonomous driving, which is also referred to as autonomous navigation or as driverless driving, is the subject matter in DE 103 22 765 B4 and DE 10 2011 115 854 A1. DE 101 02 051 A1 is concerned with the planning of a repair of mobile working machines, and DE 10 2010 039 879 A1 relates to synchronizing a delivery of a spare part with the use of the spare part in a vehicle. DE 103 29 871 A1 is concerned with diagnostics and software updates via the mobile Internet, DE 102 43 093 A1 describes a diagnostic tester operating via a control center, and DE 10 2004 016 227 A1 presents a system architecture for telematics.

LIST OF DESIGNATIONS

10 Vehicle which is undrivable
20 Breakdown service location (Roadside Assistance)
30 Assistance vehicle
40 Repair facility (servicing facility)
S5 Deciding in the vehicle whether human assistance is necessary
S10 Requesting an assistance vehicle
S15 Deciding at the breakdown service location whether human assistance is necessary
S20 Driverless navigation to the location of the vehicle
S30 Driverless and/or automatic towing to the repair facility
S40 Driverless and/or automatic navigation to the breakdown service location
S50 Driverless and/or automatic navigation to the location or to a residence
S60 Automatic detection of a need for servicing
S70 Interrogation of a keeper of the vehicle or driver
S80 Agreement of appointment

The invention claimed is:

1. A method for assisting a vehicle which is determined to be unsafe or unable to be driven further, the method comprising:
   requesting an assistance vehicle via a control device of the vehicle automatically based on detection of a breakdown and position information of the undrivable vehicle;
   navigating the assistance vehicle to the undrivable vehicle based on the position information;
   deciding, at the vehicle, based on a cause of the vehicle being undrivable, whether restoring driving capability of the undrivable vehicle requires human assistance;
   deciding to navigate the assistance vehicle in a driverless state to a location of the undrivable vehicle at least in response to deciding that restoring the driving capability of the undrivable vehicle does not require human assistance;
   deciding to navigate the assistance vehicle in a driverless state to a location of the undrivable vehicle in response to deciding that restoring the driving capability of the undrivable vehicle merely requires remote human assistance, and
   providing remote repair assistance measures to restore the undrivable vehicle and navigating the assistance vehicle in a driverless state to a breakdown service location without the restored undrivable vehicle, wherein the assistance vehicle does not tow the restored undrivable vehicle.

2. The method of claim 1, further comprising:
   requesting the assistance vehicle based on position information of the undrivable vehicle; and
   navigating the assistance vehicle to the undrivable vehicle in a driverless state based on the position information.

3. The method of claim 2, further comprising:
   detecting whether restoring the driving capability of the undrivable vehicle does not require human assistance or merely requires remote human assistance based on a cause for why the undrivable vehicle is undrivable.

4. The method of claim 3, further comprising the undrivable vehicle transmitting information relating to the cause of the undrivability, wherein the detection of whether restoration of driving capability requires human assistance takes place outside the undrivable vehicle using the transmitted information.

5. The method of claim 3, wherein the detection of whether restoration of driving capability requires human assistance takes place in the undrivable vehicle based on the cause of the undrivability, and the request for the assistance vehicle comprises an indication that the remedying of the undrivability cause requires human assistance, and/or a negative indication that the remedying of the undrivability cause does not require human assistance or only requires remote assistance.

6. The method of claim 3, wherein the assistance vehicle also navigates in a driverless state to the undrivable vehicle if the remedying of the cause requires human assistance by a person skilled in the art at the location of the undrivable vehicle, wherein the assistance vehicle also transports the person skilled in the art to the undrivable vehicle.

7. A method for assisting a vehicle which requires repair and/or maintenance comprising:
   calling an assistance vehicle with a control device of the vehicle in response to detection of a breakdown of the vehicle by a sensor system of the vehicle;
   taking the vehicle by the assistance vehicle operating in a driverless state to a repair location, wherein the assistance vehicle navigates to the vehicle and tows the vehicle while operating in a driverless state, and
   navigating the vehicle in a driverless state automatically with remote control to a location of the breakdown or another predefined location after a repair at the repair location.

8. The method of claim 7, wherein the vehicle is determined to be unusable or unable to be driven further, and detecting whether restoring the driving capability of the undrivable vehicle does not require human assistance prior to dispatch of the assistance vehicle.

* * * * *